Figure 1:
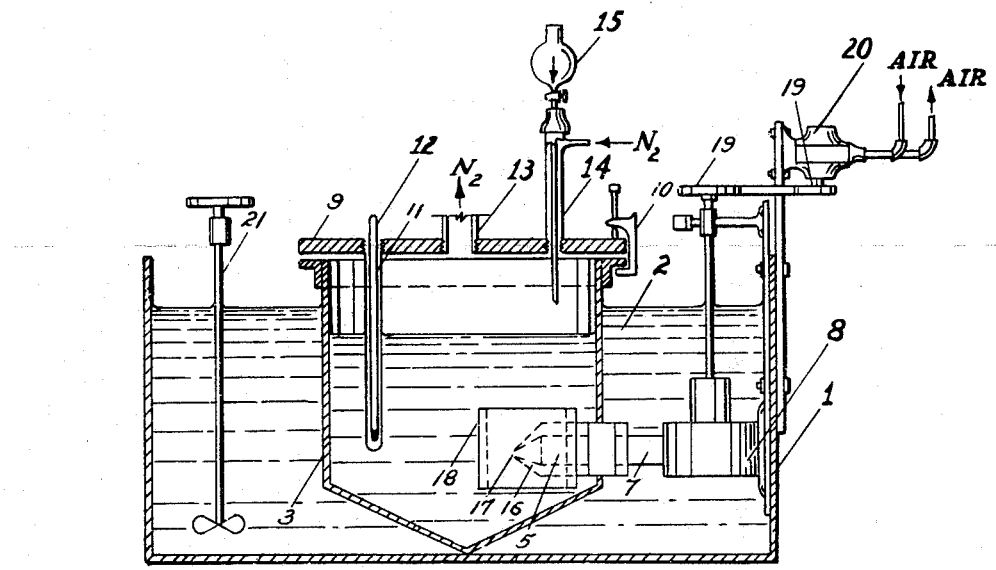

Nov. 8, 1949     V. L. HANSLEY     2,487,334
ALKALI METAL DISPERSIONS AND THE
METHOD OF PREPARING THE SAME
Filed Aug. 8, 1947

VIRGIL L. HANSLEY
INVENTOR.

BY *Amer G. Cole*

AGENT.

Patented Nov. 8, 1949

2,487,334

UNITED STATES PATENT OFFICE 2,487,334

ALKALI METAL DISPERSIONS AND THE METHOD OF PREPARING THE SAME

Virgil L. Hansley, Niagara Falls, N. Y., assignor to E. I. du Pont de Nemours & Company, Wilmington, Del., a corporation of Delaware Application August 8, 1947, Serial No. 767,667

13 Claims. (Cl. 252—309)

This invention relates to alkali metal dispersions in inert liquids and to their preparation.

The alkali metals constitute one of the most active classes of elements. Yet in many of their known reactions, reaction occurs very slowly when the metal is employed in such forms as wire, cubes or the like, or as molten metal. This is generally due to the fact that the metal is in a form which presents a relatively small proportion of the metal as metal surface to the reaction. In many instances the surface exposed is reduced as the reaction proceeds by the formation thereon of insoluble reaction products with the result that the rate of reaction is still further reduced.

Dispersions of such metals in inert liquids such as xylene, toluene, ether, petroleum solvents, paraffin oil and the like have been known and used heretofore advantageously because of the relatively finely divided condition of the metal and, therefore, the relatively great surface of metal presented. In such known dispersions, which in the case of sodium are often referred to as "sodium sand," the diameter of the individual sodium particles usually is between 500 and 3000 microns and after vigorous shaking the particles settle rapidly, often with reagglomeration. Such "sands" are generally made by dispersing the metal at a temperature above its melting point. The dispersion must then be carefully cooled through the melting point to prevent coalescing or "seizing" of the particles. In the final "sand" dispersions the solid particles settle out fairly rapidly.

Sodium dispersions of particle size averaging about 100 microns in which substantially no settling of particles occurs over long periods of time may be prepared by the method of my Patent 2,394,608. That method involves adding with agitation a small amount of a higher fatty acid to a sodium dispersion at a temperature above the melting point of sodium. The acid immediately is converted to a sodium soap which forms a gel structure in the system. Particles of sodium, e. g. of 100 to 200 microns, may be suspended in such a gel. The fatty acid soap thus functions as a stabilizer against settling.

I have discovered a convenient, highly effective and practical method of making alkali metal dispersions in inert organic liquids of much finer metal particle size than in previously known dispersions. Because of the greater fineness of the dispersed metal particles in my new dispersions, the metal content thereof is in a much more highly reactive form and such dispersions are highly valuable for uses in many industrial applications.

It is accordingly an object of my invention to provide new and improved dispersions of alkali metals in inert organic liquids, particularly hydrocarbon liquids, and to provide a convenient and practical method for making such dispersions. Another object is a method of preparing alkali metal dispersions which are stable against agglomeration and settling, are relatively fluid, and in which the average particle size of the dispersed metal does not exceed about 20 microns and in general is of the order of 1 to 5 microns. Still further objects will be apparent from the following description.

The above objects are accomplished in accordance with the invention in general by preparing an emulsion of finely divided molten particles of an alkali metal in an inert organic liquid having a boiling point above the melting point of the metal in the presence of an emulsifying agent of the type hereinafter defined. Such dispersions may be prepared by heating together an alkali metal and the inert liquid to a temperature between the melting point of the metal and the boiling point of the liquid in the presence of the emulsifying agent while effectively agitating the mixture. The emulsifying agent may be present during the entire operation or may be added during the latter part of the period of agitation. Agitation of the mixture may be accomplished by any desired method which will effect the proper degree of subdivision of the molten metal. The resulting emulsion may then be cooled to a temperature below the melting point of the metal to obtain the improved dispersions of my invention.

A convenient form of apparatus for use in preparing the present dispersions comprises an emulsifying vessel in which a mixture of the metal and the inert liquid may be heated to the required temperature and a circulatory conduit system by means of which the mixture in the vessel may be pumped out of the vessel and returned thereto at the desired rate of velocity. Both the conduits leading from and to the vessel are arranged so as to be positioned below the liquid level in the vessel and are preferably near the bottom. The end of the return conduit is provided with a nozzle which extends a short distance into the vessel and has an orifice of suitable size by means of which the returning stream of liquid is forced at an abrupt angle, e. g. 90° C., against a splash plate positioned a short distance, e. g. ¼ in. away from the orifice. The conduits of the circulatory system may be of ⅜ in. diameter tubing and the nozzle orifice about 1/16 to 3/32 in. in diameter. When using a pump which circulates the liquid mixture at a rate equivalent to a linear orifice velocity of about 246 ft./sec., such an apparatus functions very satisfactorily for the present purpose for operation on the scale indicated in the following examples. Linear orifice velocities should generally be at least about 100 ft./sec. and velocities of 100 to 1000 ft./sec. are generally satisfactory. The conduit and orifice dimensions as well as the distance from the orifice to the splash plate may of course be varied considerably depending upon the scale of operation.

The vessel and circulatory system described should be provided with means for maintaining the contents of the system at a temperature above the melting point of the alkali metal. Conveniently the system may be immersed in a constant temperature oil bath. It is advantageous to provide the vessel with a suitable cover having ports therein for adding and removing materials from the system. The cover may include a well for a thermometer or thermocouple and bear means for connecting the system to a reflux condenser for returning inert liquid which becomes vaporized. A nitrogen feed line for sweeping air from the system in certain operations is desirable for safety purposes and an arrangement may be provided for siphoning off the contents of the vessel into containers wherein the product emulsion may be permitted to cool.

Figure 2:
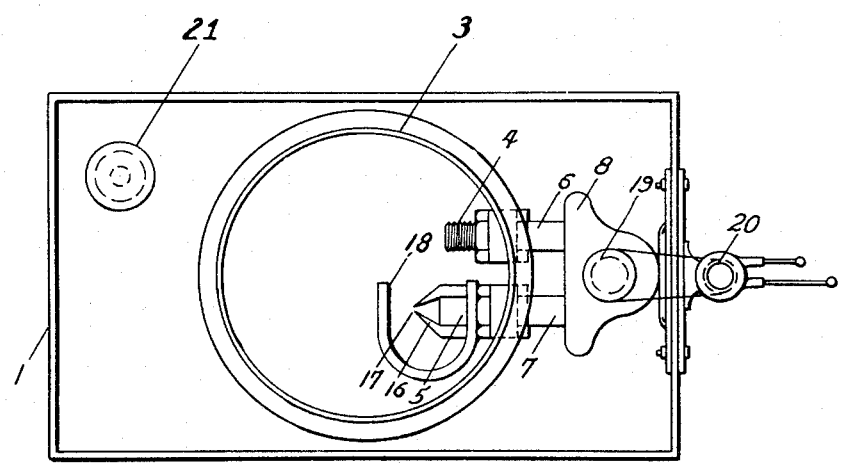

Apparatus such as described above is illustrated diagrammatically in the accompanying drawings, of which Fig. 1 is a side view shown mostly in section and Fig. 2 is a top plan view shown with the cover removed.

In the drawings, 1 is a vessel containing an oil bath 2 in which is positioned emulsifying vessel 3. Into the bottom portion of the latter pass conduits 4 and 5 which are, respectively, extensions of inlet and outlet ports 6 and 7 of pump 8. Emulsifying vessel 3 is provided with a cover 9 held in place by three clamps 10, only one of which is shown. The cover is provided with a well 11 for thermometer 12; a central port 13 for connection with a condenser (not shown) and for use as a nitrogen exit; and, with conduit 14 bearing dropping funnel 15 and having a side arm as shown for admitting a stream of nitrogen. The inner end of conduit 5 is provided with nozzle 16 having orifice 17 at its forward end. Opposite orifice 17 is splash plate 18 which is supported by conduit 5. Pump 8, drive pulleys 19 and air motor 20 for powering pump 8 are bolted in position on a side wall of vessel 1 as shown. Stirrer 21 is for agitating oil bath 2. Means for driving the stirrer and for heating and maintaining oil bath 2 at a suitable constant temperature are now shown and any conventional means for accomplishing such purposes may be used. It is generally desirable to insulate the side walls and bottom of vessel 1 to conserve heat and to aid in maintaining the temperature in oil bath 2 at the desired level. Such insulation is not shown in the drawings.

In operation of the apparatus illustrated, the inert organic liquid and sodium are charged into vessel 3 and when the charge has been suitably heated pump 8 is started. The pump forces a stream of the charge through orifice 17 against splash plate 18. The emulsifying agent may be added when desired by way of dropping funnel 15. A slow stream of nitrogen is passed through the apparatus during practically the entire operation.

The term "alkali metals" is used herein to include lithium, sodium, potassium, rubidium and caesium and also alloys of two or more such metals with each other, for example, potassium-sodium alloys.

The emulsifying agents which are suitable for use in practicing my invention are the organic hydroperoxides of the formula R-OOH wherein R is either: (1) a hydrocarbon radical which contains a hydroaromatic nucleus to one of whose carbon atoms the -OOH radical is directly attached; or, (2) an alkyl radical which contains a tertiary carbon atom to which the -OOH radical is directly attached. Upon addition of such a hydroperoxide to the mixture of alkali metal and inert liquid it is immediately converted by reaction with the metal to the corresponding alkali metal salt which is believed to function as the active emulsifying agent. Accordingly, the invention may be practiced by adding the hydroperoxide itself or its alkali metal salt. I prefer the former procedure by which the salt is formed in situ since that procedure is more convenient and highly effective.

Specific organic hydroperoxides which are suitable for the present purpose are tetralin hydroperoxide, decalin hydroperoxide, tertiary butyl hydroperoxide and tertiary amyl hydroperoxide, of which the following are illustrative:

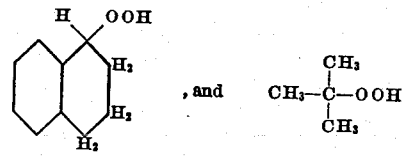

alpha-tetralin hydroperoxide    tertiary butyl hydroperoxide

In all of the following examples the apparatus which has been described in detail above was employed. The progress of emulsification was followed by preparing microscopic slides and observing them under a microscope together with a calibrated micron scale. Because of the high concentration of alkali metal in the mixtures it was necessary to dilute the emulsion to obtain slide specimens thin enough to be observed properly under the microscope. Throughout the examples and in the specification and claims the terms "emulsion" and "emulsifying agents" are used with reference to the systems when they are at a temperature above the melting point of the alkali metal, i. e. under conditions where the metal is liquid, and the terms "dispersions" and "dispersing agent" are employed with reference to the same systems when they are at a temperature below the melting point of the alkali metal.

The invention is further illustrated by the following examples:

*Example 1*

450 g. of toluene and 450 g. of sodium were introduced into the emulsifying vessel described above and the temperature of the oil bath was adjusted to 100–110° C. After the sodium had melted the circulatory pump was started. The force of circulation through the nozzle was sufficient to stir the entire charge violently and to effect a coarse dispersion of molten sodium throughout the toluene as the continuous phase. 100 cc. of 12% tetralin hydroperoxide in toluene was then added over a period of twenty minutes while continuing circulation. A vigorous reaction occurred with evolution of heat and with the sodium particles breaking down to a size of from 1-10 microns. Five g. of oleic acid was then added to form in situ sodium oleate as a protective colloid.

Example 2

450 g. of peroxide-free tetralin and 450 g. of sodium were charged into the emulsifying vessel. The oil bath temperature was adjusted to 100-110° C. and the sodium allowed to melt. After starting the circulating pump and obtaining a preliminary coarse dispersion of sodium particles averaging about twenty microns, 25 cc. of 50% tertiary butyl hydroperoxide in tetralin (diluted to 100 cc. with a sufficient quantity of tetralin withheld from the original charge) was carefully added. The sodium particle size rapidly dropped to the range of 1-5 microns. 5 g. of oleic acid was added as a protective colloid (sodium oleate) and the charge withdrawn and cooled to room temperature.

Example 3

Toluene, 450 g. and sodium, 450 g. were charged into the emulsification apparatus. The temperature of the oil bath was adjusted to 100-110° C. and the sodium allowed to melt. After preliminary coarse dispersion of the sodium had been effected, 25 cc. of a 50% solution of tertiary butyl hydroperoxide in toluene was added. After about 0.5 hr. tests showed the particle size to be 5 microns average. 5 g. of oleic acid was then added as a stabilizing agent and the product withdrawn and cooled to room temperature.

Example 4

Tetralin, 450 g., containing approximately 2% of tetralin hydroperoxide and 450 g. of sodium were charged into the emulsification apparatus. The temperature of the oil bath was adjusted to 100-110° C. and circulation started as soon as the sodium melted. After 20-25 minutes, examination under a microscope showed the particle size to be 1-10 microns. No oleic acid was necessary to prevent settling since sodium is less dense than tetralin, but it helps preserve the emulsion by forming colloidal sodium oleate by reaction with the sodium, as a protective colloid to preserve the fluid characteristics of the emulsion. Actually sodium oleate exerts a "thinning" action and emulsions containing it are much thinner than when no oleic acid has been added. With sodium oleate present, however, this emulsion is stable at 50% concentration and has the fluidity of light syrup.

The dispersions illustrated by the above examples contain the alkali metal in a form which is extremely reactive and highly useful for many applications. They may be used advantageously in carrying out the well-known Wurtz-Fittig type reactions, for refining various hydrocarbons and in reactions involving chlorohydrocarbons of the type illustrated by chlorobenzene whereby alkali metal aryls such as sodium phenyl are very easily obtained. They are also useful in carrying out Claisen type reactions and for many other purposes. Due to the very fine state of subdivision the alkali metal may be added to reaction mixtures in the form of the dispersion at rates equal to the rate of reaction without danger of hazardous amounts of unreacted metal accumulating. Care, however, should be exercised in handling the dispersions since on contact with textiles such as clothing the inert liquid is removed by capillary action which leaves a residue of the finely divided metal which may ignite spontaneously.

While the emulsifying agent may be added initially to the mixture of metal and inert liquid, the preferred method involves effecting a preliminary or partial dispersion of the metal in the inert liquid solely by means of agitation. The emulsifying agent is then added and agitation is continued and for a short time thereafter until the desired or maximum degree of subdivision is attained. The resulting emulsion may then be cooled to ordinary temperatures without requiring special precaution in handling during cooling. While fairly fine subdivision, e. g. 50 to 500 microns, may be attained merely by means of adequate agitation, the resulting dispersed particles readily coalesce and no stable system is possible in the absence of an effective emulsifying agent.

Addition of the present emulsifying agent to a mixture of molten alkali metal and inert liquid under agitation, particularly when the mixture contains 50% or more of alkali metal by weight, results in final dispersions which are fairly viscous. By the addition thereto of a small amount of a higher fatty acid, or an alkali metal soap thereof, just prior to cooling after emulsification, the fluidity of the product is greatly improved. When an acid is added it reacts immediately with the alkali metal to form a soap. Such use of a soap formed in situ by the addition of a higher fatty acid is preferred. Any of the known higher fatty acids, either saturated or unsaturated and having either a straight or a branched chain structure, may be used. Specific examples of such acids are: hexoic, diethyl acetic, heptoic, octoic, nonoic, capric, undecylic, lauric, myristic, palmitic, margaric, stearic, arachidic, cerotic, melissic, oleic and erucic acids. Generally, only small amounts of the acids are required and amounts within the range 0.1 to 5% based on the total weight of the dispersion give excellent results.

The extent of emulsification of the molten metal in the inert liquid will depend somewhat upon the effectiveness of the agitation provided. Assuming that a highly effective means is employed for agitating the mixture, the extent of the emulsification is dependent upon the amount of emulsifying agent present and the amount of metal to be dispersed since the effect of the emulsifying agent results from its action at the metal surface. Thus, for 50% dispersions, when a given amount of the agent yields dispersions of particle size averaging about 10 microns, approximately 10 times that amount is required to give a dispersion of particle size of 1 micron and approximately 100 times that original amount is required to obtain dispersions of particle size averaging 0.1 micron. For preparing dispersions containing about 20 to 65% by weight of dispersed metal, the practical concentrations of the present dispersing agents are generally within the range 0.5 to 10% based upon the total weight of the dispersion. Smaller amounts, e. g., as low as 0.05% may be used, particularly if a dispersion having a low metal content is being prepared. Larger amounts, e. g., up to 25% and higher are effective particularly when extremely finely divided particles are required but such larger amounts are not generally desired because they contaminate the product unduly.

The present dispersions may be prepared so as to contain any desired amount of dispersed metal which is practical in the preparation and use of such dispersions. To be practical such dispersions will usually contain between 20 to 65% alkali metal by weight. Above that amount there is difficulty in obtaining dispersions which are suitably fluid for handling purposes and below that amount the content of metal is generally too low to be practical for most uses.

Any temperature between the melting point of the alkali metal and the boiling point of the inert organic liquid may be employed in preparing the present products. The preferred temperature is generally within the range of from just above to about 10 to 15° C. above the melting point of the metal. In the case of sodium the preferred range is about 100 to 115° C. Higher temperatures may of course be employed effectively in some cases.

Any organic liquid may be used in preparing the present dispersions so long as such liquid is inert to the alkali metal and has a boiling point above the melting point of the metal. Examples of such liquids are xylene, toluene, various petroleum solvents such as kerosene and the like and paraffin oils. If desired a second inert liquid which has a boiling point below the melting point of the metal may be added to the cooled dispersion. Such a second liquid may be useful in some instances in functioning largely to prevent raising of the temperature of the dispersion above the melting point of the metal when the dispersion is employed in carrying out certain exothermic reactions.

I claim:

1. A composition comprising a stable dispersion of finely divided particles of an alkali metal in an inert organic liquid having a boiling point above the melting point of said metal and containing as a dispersing agent 0.05 to 25% by weight of an alkali metal salt of an organic hydroperoxide of the formula R-OOH wherein R is from the group consisting of hydrocarbon radicals which contain a hydroaromatic nucleus to one of whose carbon atoms the -OOH group is directly attached and alkyl radicals containing a tertiary carbon atom to which the -OOH group is directly attached.

2. A composition comprising a stable dispersion of finely divided particles of an alkali metal in an inert hydrocarbon liquid having a boiling point above the melting point of said metal and containing 0.5 to 10% of an alkali metal salt of an organic hydroperoxide of the formula R-OOH wherein R is from the group consisting of hydrocarbon radicals which contain a hydroaromatic nucleus to one of whose carbon atoms the -OOH group is directly attached and alkyl radicals containing a tertiary carbon atom to which the -OOH group is directly attached.

3. A composition according to claim 2 wherein the metal is sodium and the salt is a sodium salt.

4. A composition according to claim 3 wherein the salt is the sodium salt of α-tetralin hydroperoxide.

5. A composition according to claim 3 wherein the salt is the sodium salt of tertiary butyl hydroperoxide.

6. A composition comprising a stable dispersion of finely divided alkali metal in an inert hydrocarbon liquid having a boiling point above the melting point of said metal and containing 0.5 to 10% of an alkali metal salt of an organic hydroperoxide and 0.1 to 5% of an alkali metal soap of a higher fatty acid, said salt being the salt of a hydroperoxide of the formula R-OOH wherein R is from the group consisting of hydrocarbon radicals which contain a hydroaromatic nucleus to one of whose carbon atoms the -OOH radical is directly attached and alkyl radicals containing a tertiary carbon atom to which the -OOH radical is directly attached.

7. A composition according to claim 6 wherein the alkali metal is sodium and the salt and soap are sodium compounds.

8. A composition according to claim 7 wherein the salt is the sodium salt of α-tetralin hydroperoxide.

9. A composition according to claim 7 wherein the salt is the sodium salt of tertiary butyl hydroperoxide.

10. A composition according to claim 6 wherein the soap is a soap of oleic acid.

11. A composition according to claim 10 wherein the alkali metal is sodium and the salt and soap are sodium compounds.

12. A composition according to claim 11 wherein the salt is the sodium salt of α-tetralin hydroperoxide.

13. A composition according to claim 11 wherein the salt is the sodium salt of tertiary butyl hydroperoxide.

VIRGIL L. HANSLEY.

REFERENCES CITED

The following references are of record in the file of this patent:

UNITED STATES PATENTS

| Number | Name | Date |
| --- | --- | --- |
| 2,394,608 | Hansley | Feb. 12, 1946 |
| 2,409,519 | Tanner | Oct. 15, 1946 |